United States Patent
Song

(10) Patent No.: US 11,077,649 B2
(45) Date of Patent: Aug. 3, 2021

(54) ANTI-JAMMING LAMINATOR

(71) Applicant: Shenzhen Sinchi Technology Ltd., Shezhen (CN)

(72) Inventor: Qilin Song, Shenzhen (CN)

(73) Assignee: Shenzhen Sinchi Technology, Ltd., Shenzhen (CN)

( * ) Notice: Subject to any disclaimer, the term of this patent is extended or adjusted under 35 U.S.C. 154(b) by 0 days.

(21) Appl. No.: 17/079,126

(22) Filed: Oct. 23, 2020

(65) Prior Publication Data
US 2021/0122149 A1 Apr. 29, 2021

(30) Foreign Application Priority Data
Oct. 24, 2019 (CN) .......................... 201921801683.5

(51) Int. Cl.
*B32B 37/00* (2006.01)

(52) U.S. Cl.
CPC .. *B32B 37/0053* (2013.01); *B32B 2037/0061* (2013.01)

(58) Field of Classification Search
CPC . B32B 37/0053; B32B 37/00; B32B 37/0046; B32B 37/0084; B32B 37/0076; B32B 37/1036; B32B 37/1027; B32B 37/1045; B32B 2037/0069; B32B 2037/0061; B32B 2037/0092; B32B 2037/1223
USPC ................................................ 156/582, 555
See application file for complete search history.

(56) References Cited

U.S. PATENT DOCUMENTS

| | | | | |
|---|---|---|---|---|
| 4,350,555 A * | 9/1982 | Popoff | ..................... | G03F 3/102 101/33 |
| 5,445,700 A * | 8/1995 | Uang | .................. | B32B 37/0053 156/359 |
| 5,580,417 A * | 12/1996 | Bradshaw | ............. | B32B 37/226 100/176 |
| 5,618,378 A * | 4/1997 | Cahill | .................... | B41F 19/062 156/358 |
| 5,853,531 A * | 12/1998 | Murphy | ............... | B32B 37/0053 156/555 |
| 6,315,020 B1 * | 11/2001 | Seki | ....................... | B32B 37/226 156/351 |
| 6,698,487 B2 * | 3/2004 | Lemens | ................ | B32B 37/226 156/494 |
| 7,338,572 B2 * | 3/2008 | Lemens | ................ | B32B 37/142 156/227 |

(Continued)

*Primary Examiner* — Francisco W Tschen
*Assistant Examiner* — Abhishek A Patwardhan
(74) *Attorney, Agent, or Firm* — Eric Karich; Karich & Associates

(57) ABSTRACT

A laminator for laminating thermal film and paper has an upper support bracket that operably mounts an upper roller, the upper roller having a plurality of grooves axially spaced along the upper roller, and an upper paper guide having a roller-receiving channel shaped to receive the upper roller at least partially therethrough. An upper plate is mounted on the upper paper guide over the roller-receiving channel, the upper plate having a plurality of plate apertures spaced by connecting ribs, the connecting ribs being sized and positioned along the axial direction of the upper roller to each fit within one of the plurality of grooves of the upper roller. The laminator further has a lower support bracket that operably mounts a lower roller.

10 Claims, 3 Drawing Sheets

(56) References Cited

U.S. PATENT DOCUMENTS 8,939,186 B2 1/2015 Mueller et al.
10,953,646 B2 * 3/2021 Melamed .............. B32B 37/226

* cited by examiner

ANTI-JAMMING LAMINATOR

CROSS-REFERENCE TO RELATED APPLICATIONS

This application for a Utility patent claims priority to Chinese patent no. ZL201921801683.5, filed Oct. 24, 2019.

BACKGROUND OF THE INVENTION

Technical Field

This utility model patent relates to the technical field of laminators, in particular to a film anti-jamming structure for laminators.

Background

When laminating with the currently available laminators, the front end of the laminating film easily adheres to the rubber roller and rotates with the rubber roller, so that the laminating film gets rolled, which causes the failure of laminating film to be smoothly discharged from the paper extrusion outlet of the laminator, leading to film jam in the laminator, and gravely affecting the performance of the laminator.

The solution provided in this application is an improvement to existing laminators regarding the above-mentioned problems.

SUMMARY OF THE INVENTION

The present invention teaches certain benefits in construction and use which give rise to the objectives described below.

The present invention provides a laminator for laminating thermal film and paper. The laminator comprises an upper support bracket that operably mounts an upper roller, the upper roller having a plurality of grooves axially spaced along axis A of the upper roller, and an upper paper guide having a roller-receiving channel shaped to receive the upper roller at least partially therethrough. An upper plate is mounted on the upper paper guide over the roller-receiving channel, the upper plate having a plurality of plate apertures spaced by connecting ribs, the connecting ribs being sized and positioned along axis A of the upper roller to each fit within one of the plurality of grooves of the upper roller. The laminator further includes a lower support bracket that operably mounts a lower roller.

A primary objective of the present invention is to provide a laminator having advantages not taught by the prior art.

Another objective is to provide a laminator that includes an anti-jamming structure.

A further objective is to provide a laminator that includes connecting ribs that prevent thermal film from rolling into the laminator.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a laminator for laminating thermal film and paper without the thermal film and/or paper jamming or rolling up inside the laminator.

Figure 1:
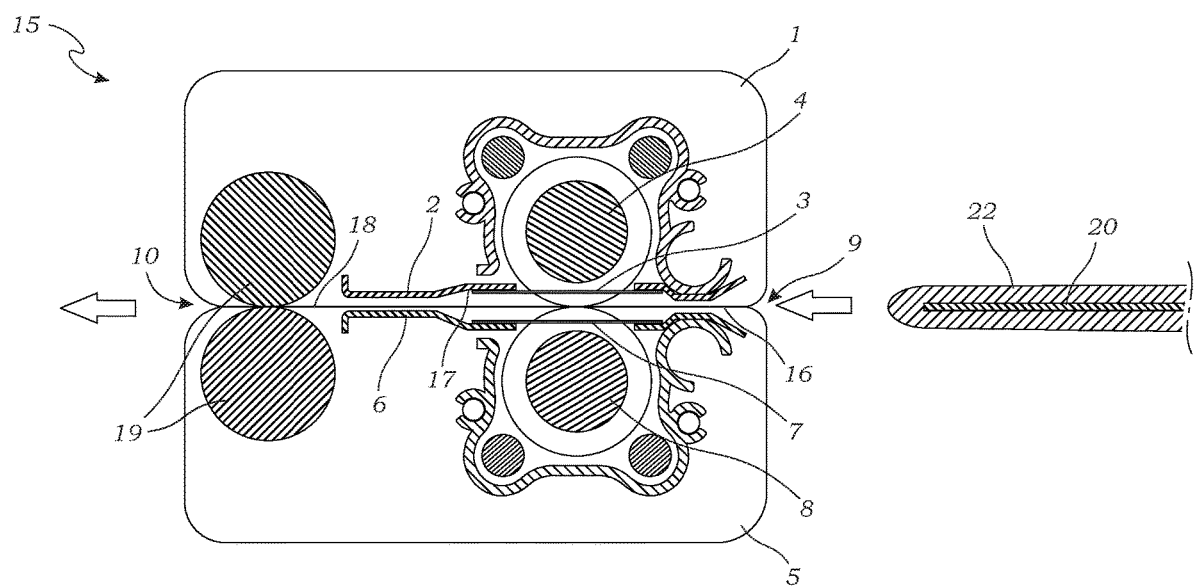
FIG. 1 is a schematic cross-sectional view of a laminator.

FIG. 1 is a schematic cross-sectional view of a laminator 15, further illustrating thermal film 22 and paper 20 entering the laminator. As shown in FIG. 1, in this embodiment, the laminator 15 comprises an upper support bracket 1 that operably mounts an upper roller 4, and an upper paper guide 2 on a lower face 16 of the upper support bracket 1, wherein the upper paper guide 2 includes a roller-receiving channel 11 shaped to receive the upper roller 4 at least partially therethrough. An upper plate 3 is further mounted on the upper paper guide 2 over the roller-receiving channel 11, which is discussed in greater detail below.

Figure 3:
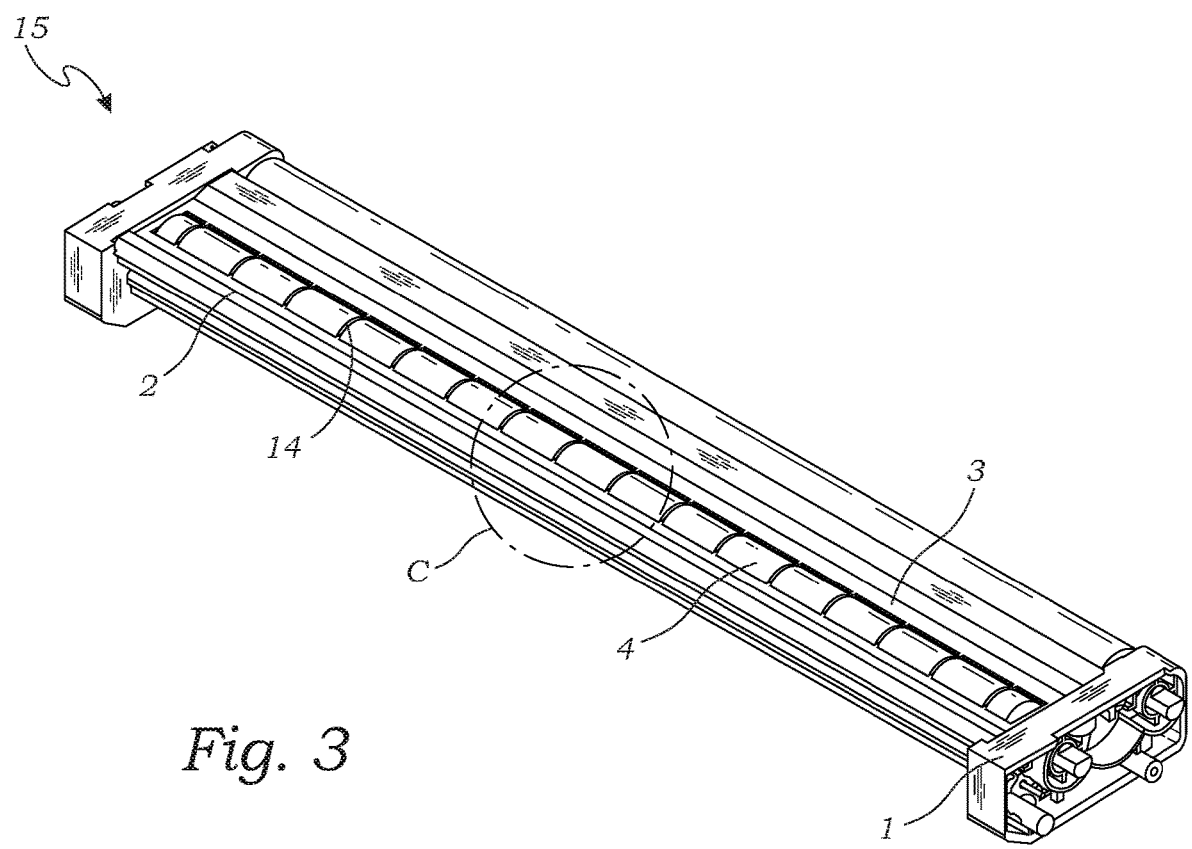
FIG. 3 is an assembled perspective view thereof mounted on an upper support bracket.
Figure 4:
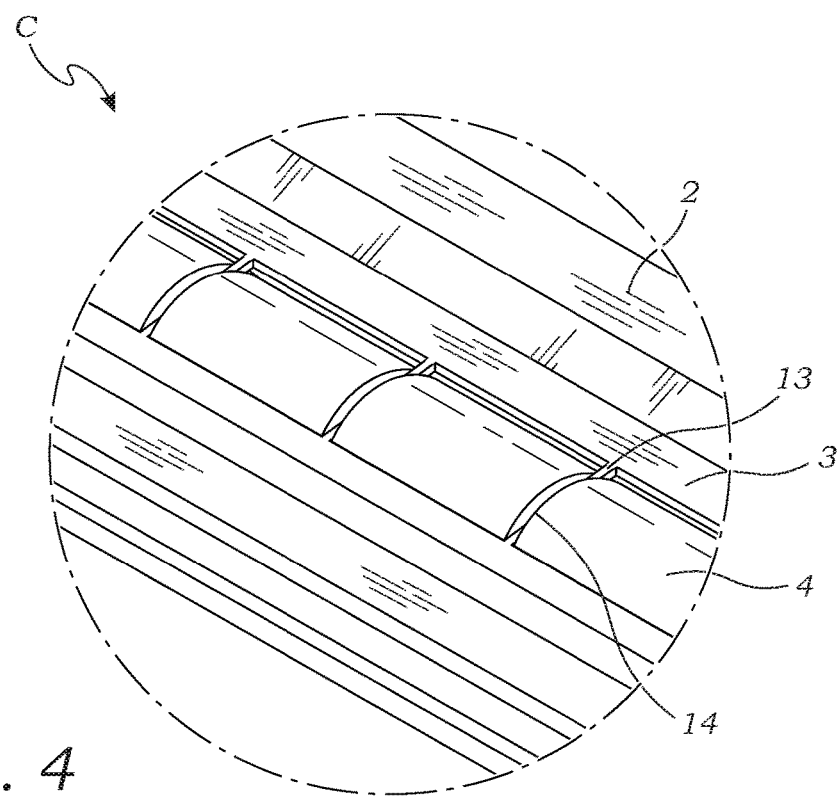
FIG. 4 is an up-close view taken from FIG. 3.

The laminator 15 may further comprise a lower support bracket 5 that is generally symmetrical to and positioned adjacent the upper support bracket 1, wherein the lower support bracket 5 operably mounts a lower roller 8, and a lower paper guide 6 having a roller-receiving channel (not shown) shaped to receive the lower roller 8 at least partially therethrough. In this embodiment, the upper and lower rollers 4 and 8 are constructed of a rubber material, but in other embodiments, the rollers 4 and 8 may be any suitable material known in the art (e.g., plastic, metal, etc.). The lower paper guide 6 is arranged on an upper face 18 of the lower support bracket 5, and may further include a lower plate 7 mounted on the lower paper guide 6 over the roller-receiving channel. The upper plate 3 and lower plate 7 may have a thickness between 0.1-0.4 mm, in this embodiment approximately 0.2 mm, and may further be parallel each other, being located between the upper roller 4 and lower roller 8. Further details of the upper and lower plates 3 and 7 are shown in FIGS. 2-4 and discussed below.

As shown in FIG. 1, the upper and lower paper guides 2 and 6 form a laminating paper feeder inlet 9 for receiving the paper 20 and the thermal film 22, and a laminate paper extruder outlet 10 opposite the laminating paper feeder inlet 9, that allows the paper 20 and the thermal film 22 to exit the laminator 15. In this embodiment, the laminating paper feeder inlet 9 is formed between the upper paper guide 2 and the lower paper guide 6, wherein the upper and lower paper guides 2 and 6 extend to the upper and lower plates 3 and 7 to form a middle gap 17 that is wider than the laminating paper feeder inlet 9 and the laminate paper extruder outlet 10, which allows the upper and lower rollers 4 and 8 to pass through each roller receiving channel 11. In some embodiments (as in the example of FIG. 1), there may be further rollers 19 within the brackets 1 and 5 before the extruder outlet 10, but in other embodiments the extruder outlet 10 may be located directly adjacent the paper guides 2 and 6. Other features commonly associated with laminators may also be provided with the present invention, or the laminator 15 may be provided as a part within another machine, which is well-known in the art and should be considered within the scope of the present application and claims.

Figure 2:
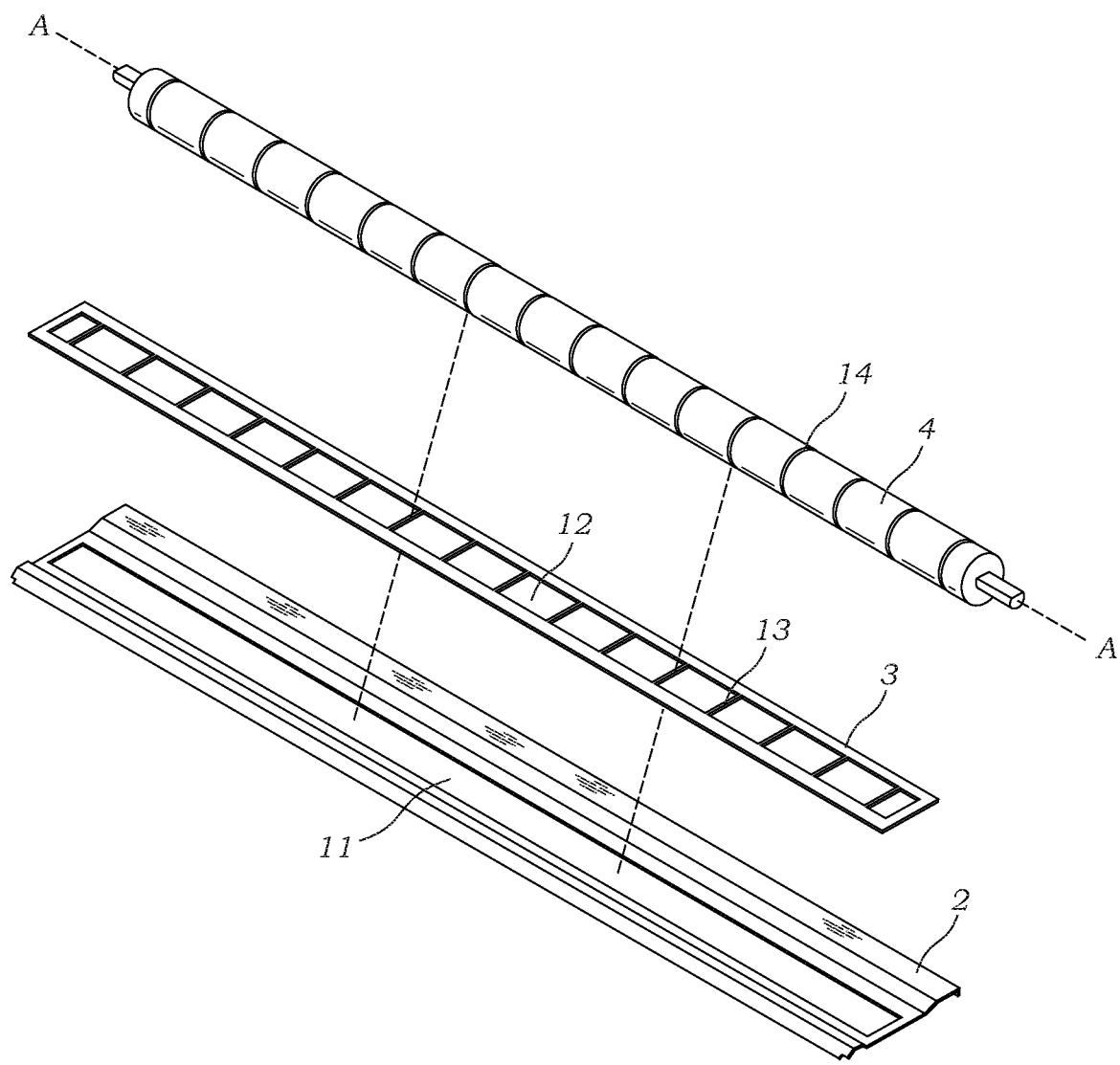
FIG. 2 is an exploded perspective view of an upper paper guide, an upper plate, and an upper roller of the laminator of FIG. 1.

FIG. 2 is an exploded perspective view of the upper paper guide 2, the upper plate 3, and the upper roller 4 of the laminator 15 of FIG. 1. As shown in FIG. 2, in this embodiment, the upper plate 3 has a plurality of plate apertures 12 spaced by connecting ribs 13, and the upper roller 4 includes a plurality of grooves 14 axially spaced along the upper roller 4. The connecting ribs 13 are sized and positioned along the axial direction of the upper roller 4 to each fit within one of the plurality of grooves 14 of the upper roller 4.

As shown in FIG. 1, in this embodiment, the lower plate 7 also includes the plurality of plate apertures 12 spaced by connecting ribs 13, and the lower roller 8 has the plurality of grooves 14, wherein the connecting ribs 13 are sized and positioned along the axial direction of the lower roller 8 to each fit within one of the plurality of grooves 14 of the lower roller 8. However, in other embodiments, the laminator 15 may include these features on just the upper portion of the laminator 15, as shown in FIG. 2.

As shown in FIG. 2, in this embodiment, the plurality of grooves 14 and the connecting ribs 13 are each arranged parallel to each other and at equal intervals. However, in other embodiments, the connecting ribs 13 and/or the plurality of grooves 14 can each be set non-parallel or with unequal spacing, provided the ribs 13 and the grooves 14 correspond to each other. For example, the connecting ribs 13 and the plurality of grooves 14 may be in various shapes and/or angles, e.g., shaped in a plurality of triangles, diagonal lines/zig-zags, irregular shapes, circles, etc. A width of the connecting ribs 13 and the plurality of grooves 14 may be between 0.1-0.4 mm. In this embodiment, the width is between approximately 0.2-0.3 mm, wherein the plurality of grooves 14 has a greater width than the connecting ribs 13 for receiving the connecting ribs 13.

FIG. 3 is an assembled perspective view of the components 15 of FIG. 2 mounted on the upper support bracket(s) 1, and FIG. 4 is an up-close perspective view of section C of FIG. 3. In this embodiment, the upper and lower plates 3 and 7 and paper guides 2 and 6 of the laminator 15 may be connected together via welding, but in other embodiments may be constructed via another means, e.g., mechanical hinges/pins, adhesives, etc., or any other manufacturing means known in the art. In construction, the thickness of each paper guide 2 and 6 may be between approximately 0.5-1.0 mm, and each plate 3 and 7 may be between 0.1-0.4 mm in thickness, wherein the plates 3 and 7 may be stamped to form the 0.2-0.3 mm wide connecting ribs 13. As shown in FIG. 4 and discussed above, the connecting ribs 13 fit into the plurality of grooves 14 formed on the rollers 4 and 8, thereby allowing the upper and lower rollers 4 and 8 to press the paper 20 and thermal film 22 therebetween.

In use, the paper 20 together with the thermal film 22 enters the laminating paper feeder inlet 9 formed by the upper and lower paper guides 2 and 6, and moves into the middle gap 17 formed by the upper and lower metal plates 3 and 7. The connecting ribs 13 of the upper and lower metal plates 3 and 7 prevent the paper 20 and/or thermal film 22 from adhering to the upper and/or lower rollers 4 and 8, while still coming into flush contact with the rollers 4 and 8 to properly laminate the paper 20. The texture of the connecting ribs 13 and the plurality of grooves 14 may further provide friction to the paper 20 and thermal film 22 so that it does not roll/crumple/jam between the rollers 4 and 8. Once the rollers 4 and 8 have pressed the thermal film 22 onto the paper 20, the now-laminated paper 20 passes through the middle gap 17, between the rest of the upper and lower paper guides 2 and 6, and out of the laminate paper extruder outlet 10.

As used in this application, the words "a," "an," and "one" are defined to include one or more of the referenced item unless specifically stated otherwise. The terms "approximately" and "about" are defined to mean+/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A laminator for laminating thermal film and paper, the laminator comprising:
   an upper support bracket that operably mounts an upper roller, the upper roller having a plurality of grooves axially spaced along the upper roller;
   an upper paper guide having a roller-receiving channel shaped to receive the upper roller at least partially therethrough;
   an upper plate mounted on the upper paper guide over the roller-receiving channel, the upper plate having a plurality of plate apertures spaced by connecting ribs, the connecting ribs being sized and positioned along the axial direction of the upper roller to each fit within one of the plurality of grooves of the upper roller; and
   a lower support bracket that operably mounts a lower roller.

2. The laminator of claim 1, further comprising:
   a lower paper guide having a roller-receiving channel shaped to receive the lower roller at least partially therethrough; and
   wherein the upper and lower support brackets are positioned adjacent each other so that the upper and lower paper guides form a laminating paper feeder inlet for receiving the paper and the thermal film, and a laminate paper extruder outlet opposite the laminating paper feeder inlet, that allows the paper and the thermal film to exit the laminator.

3. The laminator of claim 2, further comprising:
   a plurality of grooves axially spaced along the lower roller, and a lower plate mounted on the lower paper guide over the roller-receiving channel, the lower plate having a plurality of plate apertures spaced by connecting ribs, the connecting ribs being sized and positioned along the axial direction of the lower roller to each fit within one of the plurality of grooves of the lower roller.

4. The laminator of claim 3, further comprising a middle gap formed by the upper plate and the lower plates that is positioned between and has a greater width than the laminating paper feeder inlet and the laminate paper extruder outlet.

5. The laminator of claim 1, wherein the upper plate and the upper paper guide are connected together by welding, and the lower plate and the lower paper guide are connected by welding.

6. The laminator of claim 1, wherein the plurality of grooves has a greater width than the connecting ribs for receiving the connecting ribs.

7. The laminator of claim 1, wherein the plurality of grooves and the connecting ribs are each arranged parallel to each other and at equal intervals.

8. The laminator of claim 1, wherein a width of the connecting ribs is 0.1-0.4 mm.

9. The laminator of claim 1, wherein a thickness of the upper plate is 0.1-0.4 mm.

10. A laminator for laminating thermal film and paper, the laminator comprising:
   an upper support bracket that operably mounts an upper roller, the upper roller having a plurality of grooves axially spaced along the upper roller;
   an upper paper guide having a roller-receiving channel shaped to receive the upper roller at least partially therethrough;
   an upper plate mounted on the upper paper guide over the roller-receiving channel, the upper plate having a plurality of plate apertures spaced by connecting ribs, the connecting ribs being sized and positioned along the axial direction of the upper roller to each fit within one of the plurality of grooves of the upper roller; and
   a lower support bracket that operably mounts a lower roller;
   a lower paper guide having a roller-receiving channel shaped to receive the lower roller at least partially therethrough;
   a plurality of grooves axially spaced along the lower roller, and a lower plate mounted on the lower paper guide over the roller-receiving channel, the lower plate having a plurality of plate apertures spaced by connecting ribs, the connecting ribs being sized and positioned along the axial direction of the lower roller to each fit within one of the plurality of grooves of the lower roller; and
   wherein the upper and lower support brackets are positioned adjacent each other so that the upper and lower paper guides form a laminating paper feeder inlet for receiving the paper and the thermal film, and a laminate paper extruder outlet opposite the laminating paper feeder inlet, that allows the paper and the thermal film to exit the laminator.

* * * * *